May 5, 1942.  R. F. SHOUP  2,281,603

VOTING MACHINE

Filed Jan. 12, 1939  2 Sheets-Sheet 1

INVENTOR
Ransom F. Shoup
BY Kenyon & Kenyon
ATTORNEYS

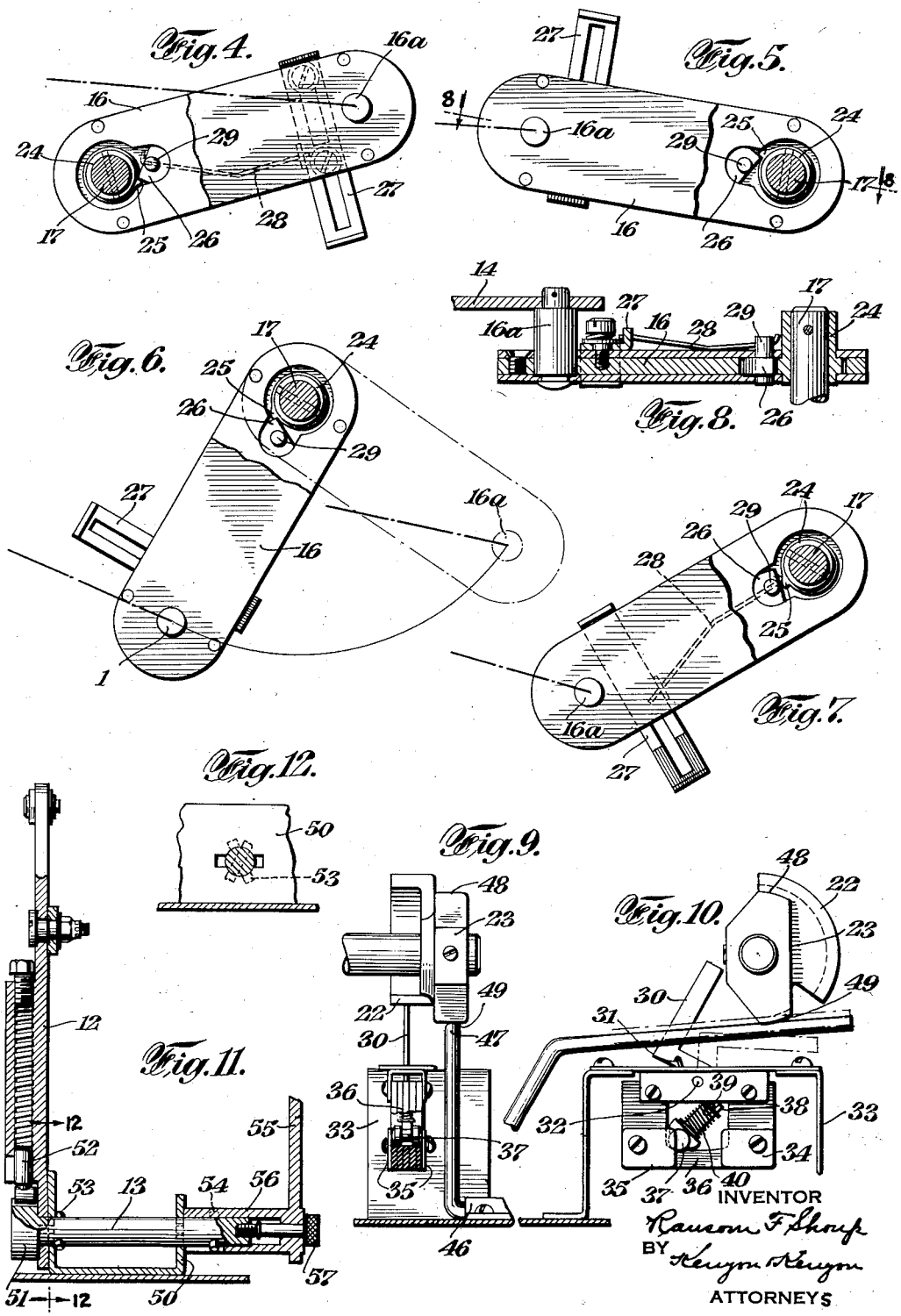

Patented May 5, 1942

2,281,603

UNITED STATES PATENT OFFICE 2,281,603

VOTING MACHINE

Ransom F. Shoup, Ardmore, Pa., assignor to The Shoup Voting Machine Corporation, Philadelphia, Pa., a corporation of Delaware Application January 12, 1939, Serial No. 250,478

25 Claims. (Cl. 74—40)

This invention relates to voting machines and more especially to mechanism for supplying power to open and close the curtains and operate the other portions of the machine in conjunction with the curtain operation. The invention is primarily applicable to voting machines of the type disclosed in Shoup et al. Patent No. 2,054,102.

An object of this invention is to provide in a voting machine mechanism by means of which the voting machine may be operated either by an electric motor controlled by the voter or by a lever manually actuated by the voter, the mechanism being of such construction that change from motor operation to manual operation may be easily and quickly made without the necessity of in any way reconditioning the machine.

Other objects, novel features and advantages of this invention will become apparent from the following specification and accompanying drawings, wherein:

Fig. 4 is a section substantially on the line 4—4 of Fig. 1;

Fig. 5 is a view similar to Fig. 4 with the parts shown in different stages of electrical operation;

Fig. 6 is a view similar to Fig. 4 but with the parts in position for manual operation;

Fig. 7 is a view similar to Fig. 6 showing an adjustment that may be required for manual operation;

Fig. 8 is a section on the line 8—8 of Fig. 5;

Fig. 9 is a section partially broken away substantially on the line 9—9 of Fig. 2;

Fig. 10 is a side elevation of Fig. 9;

Fig. 11 is a section taken substantially on the line 11—11 of Fig. 2;

Fig. 12 is a section on the line 12—12 of Fig. 11, and

Figure 1:
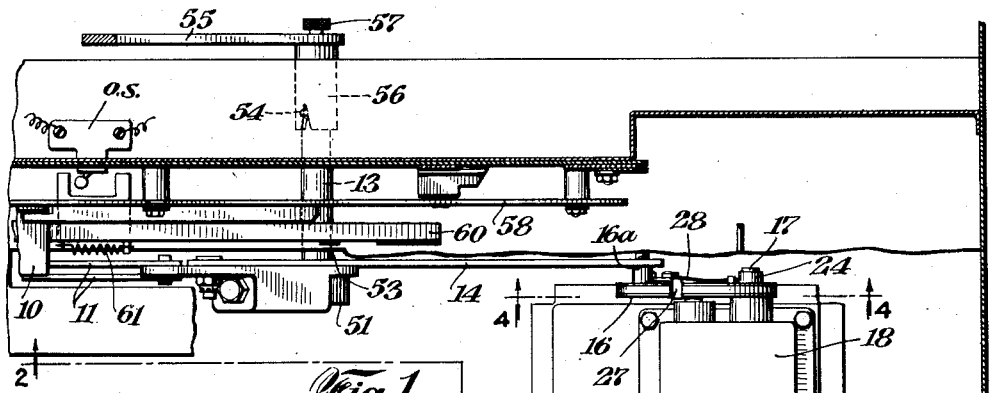
Fig. 1 is a fragmentary horizontal section through a voting machine equipped with mechanism embodying the invention and with the parts shown in position for electrical operation but with the hand lever shown in attached position, only so much of the voting machine being shown as is necessary to a complete understanding of the invention.
Figure 2:
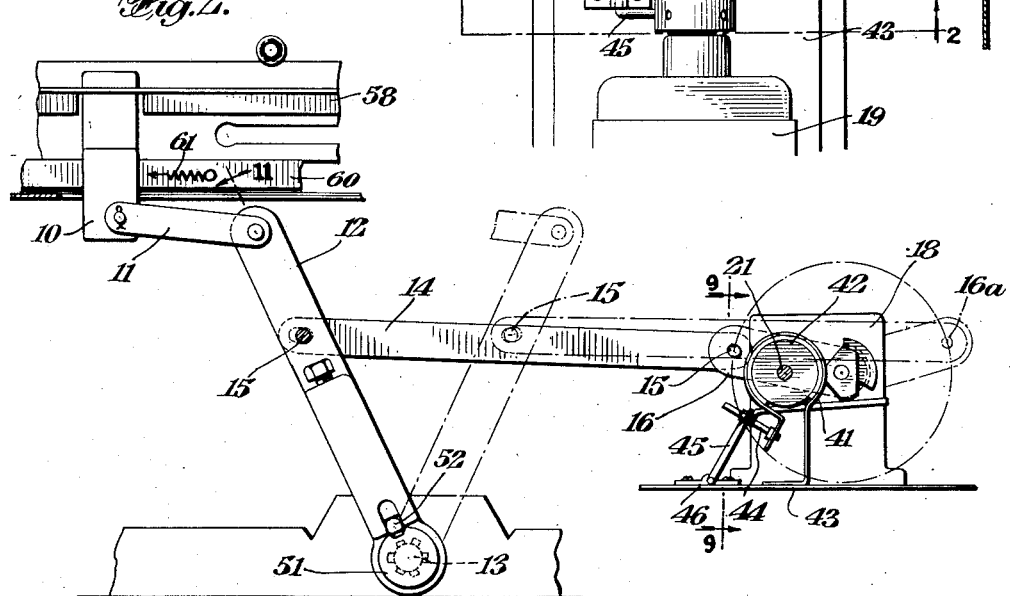
Fig. 2 is a section substantially on the line 2—2 of Fig. 1.

In Figs. 1 and 2, 58 designates the main cam bar of the voting machine which is supported for horizontal reciprocation and movement of which in one direction effects closing of the curtains and release of the spindles from locked to unlocked condition and conditions the counters while movement thereof in the reverse direction moves the curtains to open position, registers the vote and returns the counters and spindles to inoperative locked positions. This cam bar is the same as the main cam bar of Shoup et al. No. 2,054,102 except that it is now located near the bottom of the cabinet rather than near the top as formerly.

The bar 58 is provided with an arm 10 which is attached by means of a link to the end of an arm 12 carried by a shaft 13 journalled near the bottom of the machine casing. A link 14 is provided at its left end with a slot into which fits a pin 15 carried by the arm 12. The right end of the link 14 is connected to the crank pin 16a of a crank arm 16 mounted on one end of the shaft 17 of a gear reduction mechanism 18. A motor 19 is connected through the coupling 20 with the input shaft 21 of the reduction gearing 18. The remaining end of the output shaft 17 is equipped with two cams 22 and 23. The cam 22 operates a switch D. S., later to be described, and the cam 23 operates a brake mechanism also later to be described.

The shaft 17 has pinned thereto a sleeve 24 provided with a dog 25. A detent 26 is rotatably supported by the crank arm 16 in a recess for co-operation with the dog 25 to effect unitary counter-clockwise rotation of the crank arm 16 and shaft 17. The detent 26 is of such shape that it is rotatable into and out of engaging relation to the dog 25 and rotation of the detent is effected through the medium of a slide 27 supported by the crank arm 16 and a spring 28 having one end fixed to the stud 29 of the detent 26 and its other end connected to the slide 27. With the slide in the position shown in Figs. 4, 5 and 6, the detent is kept in position to be engaged by the dog 25 upon counter-clockwise rotation of the shaft 17 while permitting counter-clockwise rotation of the crank arm 16 relative to the shaft 17. With the slide 27 in the position shown in Fig. 7, the detent is moved out of position to be engaged by the dog and the crank arm 16 is free to swing on the shaft 18 both in clockwise and counter-clockwise direction.

Figure 13:
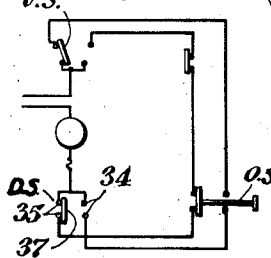
Fig. 13 is a wiring diagram.

The cam 22 constitutes an arc of a circle of less than 180° and is arranged to engage and swing the actuator 30 from the position shown in full lines in Fig. 10 to the position shown in broken lines in the same figure and then release the actuator 30 to permit it to swing back into full line position under the influence of the spring 31. The actuator 30 is L-shaped and one leg is supported by the pivot pin 32 to permit swinging movement of the actuator. The pivot pin 32 is supported by a frame 33 from which are suspended a first pair of spaced and insulated contacts 34 and a second pair of spaced and insulated contacts 35 of the switch D. S., each pair being in circuit with one pair of contacts of a double-throw voter-operated switch V. S. and with one pair of contacts of a double-throw officer operated switch O. S. the motor and a source of electrical energy. (Fig. 13.) An electrically insulated arcuate guideway 36 extends from the space between one pair of contacts to the space between the other pair of contacts and a roller-equipped circuit-completing member 37 of the switch D. S. is provided for movement along the guide between two positions, in one of which it electrically connects the contacts 34 and in the other of which it electrically connects the contacts 35 as shown in Fig. 10. The member 37 is provided with a shank 38 slotted at its end to receive a pin 39 carried by the pivoted leg of the actuator 30, a spring 40 surrounding the shank 38 and engaging the pin 39. This arrangement assures a snap action of the member 37 when operated to open one circuit and close the other.

For example, assume counter-clockwise rotation of the cam 22 (Fig. 10) thereby engaging the front end of the cam with the upper leg of the actuator 30 to cause rotation thereof into the broken line position. The pin 39 moves clockwise compressing the spring 40 and rotating the shank 38 counter-clockwise until there is alinement between the pivot 32, pin 39 and rollers of the circuit-completing member 37. Movement beyond such position results in the circuit-completing member 37, under the influence of the spring 40, rolling from the position shown in Fig. 10 along the guideway 36 to its opposite position in which it bridges the contacts 34. This action is substantially instantaneous due to the pressure applied to the member 37 by the spring 40. Further counter-clockwise rotation of the cam 22 disengages it from the upper leg of actuator 30, permitting it to return to full line position under the influence of spring 31 and reverse operation of the circuit-closing member 37 is effected.

In Figs. 1 and 2 is illustrated a slidable bar 60 forming part of the election officer's latch described and claimed in applicant's Patent No. 2,241,485. The officer's latch mechanism controls the permissible direction of movement of the main cam bar as described in said patent and the bar 60 is pushed to the right by the election officer and is returned to the left by the spring 61. The bar 60 is maintained in either its extreme left or its extreme right position by locking means controlled by the bar 58 all as described in said patent. The switch O. S. is actuated by the bar 60.

In Fig. 10 is shown the arrangement of the switch D. S. and its operating parts when the curtains are closed and the machine is conditioned for voting. At such time, the officer's operated switch V. S. and the officer's operated switch O. S. are in the positions shown in Fig. 13 with the bridging member 37 engaging the contacts 35 as shown in Fig. 13 and the motor circuit is opened. After a voter has finished actuating the spindles, he operates the switch V. S. to move the bridging member into the position opposite to that shown in Fig. 13, thereby closing the motor circuit and causing operation of the motor. Counter-clockwise rotation is effected of the cam 22 by the motor, thus causing actuation of the arm 30 by the cam as previously described with the resulting movement of the bridging member 37 from the position shown in Fig. 10 to its opposite position, thereby open-circuiting the motor and causing it to stop with the curtains in open position, the stopping of the motor at the proper point being assured through the operation of brake mechanism subsequently to be described. The voting machine is then ready for the exit of the voter and the entry of the next voter. Upon the entry of the second voter, the election officer operates the switch O. S. to move its bridging member to the position opposite to that shown in Fig. 13, after which the voter operates the switch V. S. to return its bridging member to the position shown in Fig. 13, thereby closing the motor circuit and causing movement of the main cam bar into curtain-closed position with consequent return of the bridging member 37 to the position shown in Figs. 10 and 13. Just prior to the arrival of the main cam bar at curtain-closed position, the switch O. S. is automatically actuated to return its bridging member to the position shown in Fig. 13.

A brake band 41 partially surrounds a brake drum 42 on the motor drive shaft. One end of the brake band is substantially straight and is attached to the bottom of the voting machine at 43. The other end of the brake band is attached through an adjusting screw 44 to the arm 45 of a lever pivotally supported at 46. The remaining arm of the lever extends beneath the cam 23 and is adapted to be engaged by the dwell surfaces 48 and 49, each of which constitutes a short arc of a circle concentric with the axis of the shaft 17 and both lying within a span of 180°. The diameter of the surface 49 is slightly greater than the diameter of the surface 48 for a purpose which will later become apparent. Upon engagement of either the surface 48 or the surface 49 with the arm 47, the brake band 41 is clamped against the brake drum 42 for the purpose of bringing the shaft 17 to rest.

The arrangement of the cams 22 and 23 is such that the crank arm 16 is brought to rest in two positions within 180° of each other as indicated in Fig. 2 in full and broken lines. In each rest position, the crank arm 16a lies above the horizontal plane passing through its axis. The purpose of having the crank arm 16 lie above horizontal in the curtain open position of the machine (broken line position of Fig. 2) is to facilitate manual operation of the machine in the event of current failure with the machine in curtain open position as fully explained subsequently. Such rest position of the arm 16 permits actuation of the arm 16 by leftward pull on the link 14 whereas if the rest position of the arm 16 in curtain open position were in line with link 14, rotation of the arm 16 could not be effected merely by pull on the arm 14 as there would be a dead center relation. The purpose of having the crank arm 16 lie above horizontal in the curtain closed position of the machine (full line position of Fig. 2) is to prevent any possibility of rightward movement of the bar 58 under the influence of other parts of the machine. Such rightward movement of the bar 58 with the crank arm 16 in the position shown in full lines in Fig. 2, is prevented by reason of the fact that the crank arm 16 cannot rotate clockwise on the shaft 17 so long as the detent 26 is in position to be engaged by the dog 25. During electrical operation of the machine, the bar 58 can be moved rightward from the position shown in Fig. 2 only by counterclockwise rotation of the arm 16 from the position shown in full lines in Fig. 2.

The shaft 13 is journalled in the sides of a channel member 50 and has an integral cylindrical head 51 of larger diameter than the remainder. The crank 12 has an opening through which the shaft 13 extends and is arranged between the head 51 and one side of the channel member 50. The head is provided with a recess into which fits the end of a spring-pressed plunger 52 mounted in a housing provided on the arm 12. In the arm 12 and in both sides of the channel member 50 are provided alined slots for the purpose of permitting the passage therethrough of pins 53 and 54 extending through the shaft 13. The pins 53 prevent movement to the left of the shaft 13 (Fig. 11) as the arrangement of the slots is such that the normal working thereof by the arm 12 does not bring the pins into register with the slots. The pins are brought into register with the slots only during assembly and before the arm 12 is connected to the link 11.

A handle 55 is provided for manually operating the main cam bar 58 and this lever is provided with a hollow hub 56 which fits over a shaft 13 and is provided with slots to receive the pins 54 for the purpose of keying the operating handle to the shaft. The handle is provided with an attachment screw 57 which is adapted to be threaded into the end of the shaft 13 to prevent accidental axial movement of the arm 55 resulting in disconnection of the arm from the shaft. It is intended that the voting machine shall be electrically operated except in the event of motor failure and the arm 55 is attached to the shaft 13 only when there is motor failure which may be due either to some fault in the motor or to power failure.

By reference more especially to Figs. 1, 2, 4, 5, 6, 8, 9 and 10, will be explained the electrical operation of the machine. When the curtains are in open position, the crank arm 16 is in the position shown in Fig. 4 and the link 14 and arm 12 are correspondingly arranged as shown in broken lines in Fig. 2, while the cams 22 and 23 are correspondingly oriented from the position shown in Figs. 2 and 10, the brake 41 being applied through the medium of contact of surface 48 with the arm 47 and the circuit-completing member 37 being in the position opposite to that shown in Fig. 10 and the arm 30 being held in the broken line position of Fig. 10 by the cam 22. Upon operation by the voter of the switch V. S., the motor energizing circuit is closed through the contacts 34 and the circuit-closing member 37, thereby causing counter-clockwise rotation of the shaft 17. The surface 48 moves out of engagement with the arm 47, thus releasing the brake, and the shaft 17 by reason of the engagement of the dog 25 with the detent 26 causes counter-clockwise rotation of the arm 16 from the position shown in Fig. 4 to the position shown in full lines in Fig. 2 and in Fig. 5, thus causing movement of the arm 12 from the broken line position of Fig. 2 to the full line position of the same figure with consequent movement of the main cam bar 58 into the position shown in Fig. 2. As the cam 22 rotates, it releases the arm 30 which, under the influence of the spring 31 moves to the full line position of Fig. 10 and causes movement of the circuit-completing member 37 into the position shown in Fig. 10. Further counter-clockwise rotation of the shaft brings the surface 49 into contact with the arm 47 again to apply the brake. The arrangement of the cam 22, arm 30 and circuit-closing member 37 and the arrangement of the surface 48 is such that the crank arm 16 is brought to rest with the crank pin 16a above dead center, that is, above the line connecting the axis of the pin 15 and the axis of the shaft 17.

As previously mentioned, with the cam bar 58 in the position shown in Fig. 2, the machine is conditioned for voting and after the voter has completed actuation of the voting spindles or handles, he again operates the switch V. S. to close the motor-energizing circuit through the contacts 35 and the circuit-completing member 37, resulting in additional counter-clockwise rotation of the shaft 17 with consequent disengagement of the surface 49 from the lever 47 to release the brake. After a predetermined amount of movement, the cam 22 engages the arm 30 to swing it from the full line position of Fig. 10 to the broken line position of the same figure, thereby moving the member 37 to open-circuit the motor and electrically connect the contacts 34. The surface 48 again engages the arm 47 to apply the brake and again the arrangement of the cam 22 and the surface 49 is such that the arm 16 comes to rest with the crank pin 15 above dead center. On both the curtain-closing and curtain-opening stroke of the cam bar 58, it releases the election officer's latch bar 60. The officer's latch bar is released by the bar 58 further from the end of its curtain-closing stroke than from the end of its curtain-opening stroke. On the curtain-closing stroke, the bar 58 is still pulling the curtains and the crank 16a is above dead center while on the curtain-opening stroke the crank pin 16a is below dead center. The switch D. S. is actuated both on the curtain-closing and curtain-opening stroke to break the motor circuit simultaneously with the release of the election officer's latch bar 60. As on both the curtain-closing and curtain-opening stroke of the main cam bar, the crank arm 16 is brought to rest with the crank pin 16a above dead center position, the arm 16 travels a much shorter arc after the motor circuit is opened on the curtain-closing stroke of the cam bar than is the case on the curtain-opening stroke. Therefore, less brake pressure is required to bring the shaft 17 to rest in the latter case than in the former and for this reason the diameter of the surface 48 is less than the diameter of the surface 49. The crank pin 15 is brought to rest above dead center both in curtain-open and curtain-closed position to facilitate change over from electric to manual operation as will become apparent later.

Figure 3:
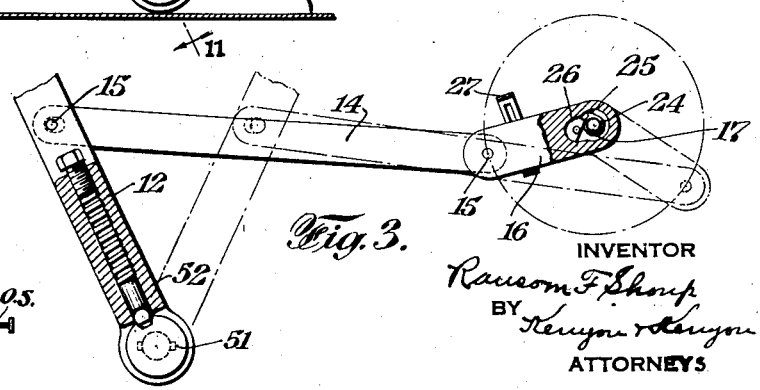
Fig. 3 is a fragmentary view generally similar to Fig. 2 but with the parts shown in position for manual operation.

In the event of motor failure, operation of the voting machine can be continued merely by attaching the handle 55. Should motor failure occur with the crank arm 16, link 14 and arm 12 in curtain-open position, as indicated in broken lines in Fig. 2, these elements, together with the main cam bar can be moved to curtain-closed position merely by clockwise rotation of the shaft 13 through the medium of the handle 55, this being due to the fact that the crank arm 16 is free to rotate counter-clockwise on the shaft 17. After the voter has indicated his vote in the usual manner, he may open the curtains and reset the machine by further operation of the lever 55, first to swing the arm 12 counter-clockwise slightly beyond the position shown in Fig. 2, so that by reason of the pin and slot connection between the arm and link 14, the latter, together with the crank arm 16 will drop by gravity through and below dead center position, after which the voter moves the lever to rotate the shaft 13 clockwise, thereby returning the arm 12 to the broken line position of Fig. 2 and the crank arm 16 to the broken line position of Fig. 3. The crank arm 16 will not return to the broken line position of Fig. 2 as there will be no force to carry it beyond dead center. The same operation can be effected if motor failure occurs with the machine in curtain-closed position or in any position of the curtain-closing stroke. Further manual operation by the lever 55 of the arm 12 and main cam 58 will result merely in the crank arm 16 swinging back and forth between the full and broken line positions of Figs. 3 and 6.

Should motor failure occur with the crank arm 16 in any portion of the curtain-opening stroke, the arm 16 may be moved counter-clockwise by the handle 55 as previously described, but cannot be moved clockwise sufficiently to permit movement of the bar to curtain-closed position by reason of the engagement of the detent 26 with the dog 25 and the resistance of the gear mechanism 18. In such event, the slide 27 is moved from the position shown in Figs. 4, 5 and 6 to the position shown in Fig. 7, thereby moving the detent out of the path of the dog and permitting free clockwise rotation of the arm 16.

The means for interconnecting the arm 12 to the shaft 13 prevents injury to the vote-registering mechanism in the event that electrical operation of the machine has failed due to some cause other than motor failure. Should it happen that the motor does not operate the machine because of some jam in the vote-registering mechanism and the attendant, assuming that the failure of electrical operation is due to motor failure, attaches the hand lever 55 and the voter applies to the lever 55 force beyond that required normally to operate the machine, the plunger 52 will slide out of engagement with the head 51, thereby preventing the application of excessive force to the vote-registering mechanism. Also, if with the machine set up for manual operation a voter tries to operate any lever 55 when he is not qualified or the machine is locked against voting, the plunger 52 releases as previously described.

As shown in Fig. 13, the motor energizing circuit includes two parallel sections, in the first of which are included the contacts 34 and in the second of which are included the contacts 35 and in the first of which are included one pair of contacts of the voter-operated switch V. S. and in the second of which are included the second pair of contacts of said voter-operated switch while also in the first branch are included a pair of contacts of the switch O. S. and in the second branch are included the remaining pair of contacts of said switch. The roller 37 is movable into and out of bridging relation to the contacts 34 and 35 while both the switch V. S. and the switch O. S. is provided with a similar bridging member. In order to energize the motor circuit, it is necessary that the bridge member of the three switches be in operative relation to the three pairs of contacts in one branch or the other. Flow of current to the motor is interrupted by unbridging any pair of contacts in one branch. Thus, for a voter to start the motor, the member 37 must be in operative relation to one pair of contacts and the bridging member of the switch O. S. must be in operative relation to its associated contacts in the same branch so that upon operation by the voter of the switch V. S. into operative relation to its associated contacts of the same branch, a circuit will be closed through said branch to the motor.

I claim:

1. In a voting machine, an operating bar movable to and fro, means including an electric motor and a shaft driven thereby for actuating said bar, a pair of motor-energizing circuits, a voter operable switch common to both circuits for opening one circuit and simultaneously closing the other, a second switch common to both circuits for opening one circuit and simultaneously closing the other, an election official operable slide for actuating said switch and movable between two positions, means controlled by said bar for locking said slide in either of its two positions, and switch mechanism common to both circuits operated in timed relation to said shaft for opening either circuit while conditioning the other for closing by operation of said other two switches.

2. In a voting machine, the combination according to claim 1 characterized by brake mechanism for said motor controlled by said shaft.

3. In a voting machine, the combination according to claim 1 in which the connections between said shaft and bar include a crank arm and the switch mechanism is operated to stop said motor with the crank arm in either of two positions within 180° of each other.

4. In a voting machine, a reciprocating operating bar, a shaft, a motor for rotating said shaft, a crank arm carried by said shaft, coacting means on said shaft and crank arm for effecting rotation of said crank arm in one direction by said shaft while permitting rotation of the crank arm relative to the shaft in said direction, a lost motion connection between said crank arm and said bar, and motor-control switch mechanism operated in timed relation to said shaft to stop said crank arm in either of two positions within 180°.

5. In a voting machine, the combination according to claim 4 in which said operating bar moves horizontally, said shaft is horizontal and the rest positions of said crank arm lie above the horizontal plane passing through said shaft axis.

6. In a voting machine, the combination according to claim 4 characterized by brake mechanism for said motor controlled by said shaft.

7. In a voting machine, the combination according to claim 4 in which said operating bar moves horizontally, said shaft is horizontal, the rest positions of said crank arm lie above the horizontal plane passing through said shaft axis and brake mechanism for said motor is controlled by said shaft.

8. In a voting machine, an operating bar movable to and fro, a shaft, an electric motor for driving said shaft, a crank arm rotatably supported by said shaft, means interconnecting said crank arm and said bar, a dog on said shaft, a detent pivotally supported by said arm, a member slidably supported by said arm, and a leaf spring attached at one end to said detent and at its other end to said slidable member, said member being effective in one position to maintain said detent in engaging relation to said dog and in another position to maintain said detent out of engaging relation to said dog.

9. In a voting machine, the combination according to claim 1, characterized by spring means tending to maintain said slide in one position.

10. In a voting machine, the combination according to claim 1, characterized by spring means tending to maintain said slide in one position and by brake mechanism for said motor controlled by said shaft.

11. In a voting machine, the combination according to claim 1 in which spring means tend to maintain said slide in one position and the connections between said shaft and bar include a crank arm and the switch mechanism is operated to stop said motor with the crank arm in either of two positions within 180° of each other.

12. In a voting machine, a horizontal slidable operating bar, a horizontal shaft, an electric motor for driving said shaft, a crank arm rotatably supported by said shaft, co-acting means on said shaft and crank arm for effecting rotation of said crank arm in one direction by said shaft while permitting rotation of the crank arm relative to the shaft in said direction, an oscillatable arm having a horizontal axis, connections between said oscillatable arm and said operating bar, a link interconnecting said crank arm and said oscillatable arm with lost motion between said link and oscillatable arm, and motor control switch mechanism operated in timed relation to said shaft to stop said crank arm in either of two positions above the horizontal plane passing through the shaft axis.

13. In a voting machine according to claim 12, means for rendering said coacting means inoperative to permit free rotation of the crank arm relative to the shaft in both directions.

14. In a voting machine according to claim 12, brake means for said motor controlled by said shaft.

15. In a voting machine, an operating bar movable to and fro, a shaft, an electric motor for driving said shaft, a crank arm rotatably supported by said shaft, coacting means on said shaft and crank arm for effecting rotation of said crank arm in one direction by said shaft while permitting rotation of the crank arm relative to the shaft in said direction, connections between said crank arm and said bar, a pair of motor energizing circuits, a voter-operable switch common to both circuits for opening one circuit and simultaneously closing the other circuit, a second switch common to both circuits for opening one circuit and simultaneously closing the other circuit, an election officer-operable slide for actuating said switch and movable between two positions, means controlled by said operating bar for locking said slide in either of its two positions, and switch mechanism common to both circuits operated in timed relation to the movement of said bar for opening either circuit and simultaneously conditioning the other circuit for closing by operation of said other two switches.

16. In a voting machine according to claim 15, brake means for said motor controlled by said shaft.

17. In a voting machine according to claim 15, means for rendering inoperative said coacting means to permit rotation of said crank arm on said shaft in both directions.

18. In a voting machine, an operating bar movable to and fro, a shaft, an electric motor for driving said shaft, a crank arm rotatably supported by said shaft, coacting means on said shaft and crank arm for effecting rotation of said crank arm in one direction by said shaft while permitting rotation of the crank arm relative to the shaft in said direction, an oscillatable arm having a horizontal axis, connections between said oscillatable arm and said operating bar, a link interconnecting said crank arm and said oscillatable arm with lost motion between said link and said oscillatable arm, a pair of motor energizing circuits, a voter-operable switch common to both circuits for opening one circuit and simultaneously closing the other circuit, a second switch common to both circuits for opening one circuit and simultaneously closing the other circuit, an election officer-operable slide for actuating said switch and movable between two positions, means controlled by said bar for locking said slide in either of its two positions, and switch mechanism common to both circuits operated in timed relation to the movement of said bar for opening either circuit and simultaneously conditioning the other circuit for closing by operation of said other two switches.

19. In a voting machine according to claim 18, brake means for said motor controlled by said shaft.

20. In a voting machine according to claim 18, means for rendering inoperative said coacting means to permit rotation of said crank arm on said shaft in both directions.

21. In a voting machine according to claim 15, resilient means tending to maintain said slide in one position.

22. In a voting machine according to claim 15, resilient means tending to maintain said slide in one position, and means for rendering inoperative said coacting means to permit rotation of said crank arm on said shaft in both directions.

23. In a voting machine according to claim 18, resilient means tending to maintain said slide in one position.

24. In a voting machine according to claim 18, resilient means tending to maintain said slide in one position, and means for rendering inoperative said coacting means to permit rotation of said crank arm on said shaft in both directions.

25. In a voting machine, an operating bar movable to and fro, a driven shaft, a dog on said shaft, a crank arm rotatably supported by said shaft, a detent pivotally supported by said crank arm for engagement with said dog, a strip of resilient material extending from said detent, a member slidably supported by said crank arm and connected to the free end of said resilient strip, said resilient strip being effective in one position of said member to maintain said detent in position for engagement by said dog to effect rotation of said arm in one direction while permitting free rotation of said crank arm on said shaft in said direction and being effective in another position of said member to maintain said detent out of dog engaging position, and means interconnecting said crank arm and bar.

RANSOM F. SHOUP.

CERTIFICATE OF CORRECTION.

Patent No. 2,281,603. May 5, 1942.

RANSOM F. SHOUP.

It is hereby certified that error appears in the printed specification of the above numbered patent requiring correction as follows: Page 2, first column, lines 70 and 71, strike out the words "officer's operated", both occurrences; page 4, second column, lines 71 and 72, claim 8, strike out "an electric motor for driving said shaft," and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.